US009618972B2

(12) United States Patent
DeLuca et al.

(10) Patent No.: US 9,618,972 B2
(45) Date of Patent: Apr. 11, 2017

(54) THREE-DIMENSIONAL, MULTI-DEPTH PRESENTATION OF ICONS IN ASSOCIATION WITH DIFFERING INPUT COMPONENTS OF A USER INTERFACE

(75) Inventors: Michael Joseph DeLuca, Boca Raton, FL (US); Alexander Samson Hirsch, Highland Park, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 1593 days.

(21) Appl. No.: 13/010,580

(22) Filed: Jan. 20, 2011

(65) Prior Publication Data
US 2012/0192067 A1 Jul. 26, 2012

(51) Int. Cl.
G06F 3/00 (2006.01)
G06F 3/048 (2013.01)
G06F 1/16 (2006.01)
G06F 3/0481 (2013.01)
(Continued)

(52) U.S. Cl.
CPC .......... *G06F 1/1637* (2013.01); *G06F 1/1643* (2013.01); *G06F 3/0488* (2013.01); *G06F 3/04815* (2013.01)

(58) Field of Classification Search
None
See application file for complete search history.

(56) References Cited

U.S. PATENT DOCUMENTS 6,064,354 A 5/2000 DeLuca
6,297,752 B1 * 10/2001 Ni .................. G06F 1/1616
341/20
6,559,813 B1 5/2003 DeLuca et al.
(Continued)

FOREIGN PATENT DOCUMENTS

EP 1667471 A1 6/2006
EP 2148269 A1 1/2010
GB 2451952 A 2/2009

OTHER PUBLICATIONS

Darren Quick, Back-type adds a physical keyboard to a tablet's backside, Oct. 8, 2010, 4 pages.*
(Continued)

*Primary Examiner* — Yongjia Pan
(74) *Attorney, Agent, or Firm* — Thomas Grzesik; Fleit Gibbons Gutman Bongini & Bianco P.L.

(57) ABSTRACT

A three-dimensional display presents a plurality of icons that are associated with a user interface of an electronic device. The plurality of icons include at least a first icon presented at a first depth of presentation and a second icon presented at a second, different depth of presentation. The first icon is associated with a first input component of the user interface, such that the first input component provides for interaction with the first icon. The second icon is associated with a second input component of the user interface, such that the second input component provides for interaction with the second icon. The aforementioned depths of presentation may substantially coincide with various surfaces of the electronic device (such as a first touch-sensitive surface and a second touch-sensitive surface). This approach can serve to facilitate three-dimensional presentation of icons for interaction by touch-sensitive surfaces on the front and back of the electronic device.

20 Claims, 3 Drawing Sheets

(51) Int. Cl.
*G06F 3/0488* (2013.01)
*G06F 3/01* (2006.01)

(56) References Cited

U.S. PATENT DOCUMENTS

| | | | | |
|---|---|---|---|---|
| 7,088,342 | B2* | 8/2006 | Rekimoto | G06F 3/0488 345/169 |
| 7,218,313 | B2* | 5/2007 | Marcus | G06F 1/1626 345/168 |
| 7,490,295 | B2* | 2/2009 | Chaudhri et al. | 715/764 |
| 7,826,205 | B2* | 11/2010 | Smith | G06F 1/16 248/917 |
| 7,859,830 | B2* | 12/2010 | Morrison | G06F 1/1616 341/22 |
| 8,291,332 | B2* | 10/2012 | Chaudhri et al. | 715/764 |
| 8,321,801 | B2* | 11/2012 | Chaudhri et al. | 715/765 |
| 8,384,683 | B2* | 2/2013 | Luo | G06F 1/1626 345/158 |
| 8,566,732 | B2* | 10/2013 | Louch et al. | 715/764 |
| 8,621,380 | B2* | 12/2013 | Kocienda | G06F 1/3203 341/22 |
| 8,643,569 | B2* | 2/2014 | Vesely | G06F 3/011 345/156 |
| 8,665,218 | B2* | 3/2014 | Shiu | G06F 1/1626 345/168 |
| 8,836,637 | B2* | 9/2014 | Bychkov | G06F 3/0489 345/156 |
| 8,922,493 | B2* | 12/2014 | Kim | G06F 3/021 156/173 |
| 2002/0118175 | A1* | 8/2002 | Liebenow | G06F 1/1626 345/168 |
| 2003/0184528 | A1* | 10/2003 | Kawasaki | G02F 1/13338 345/173 |
| 2004/0208681 | A1* | 10/2004 | Dechene | G06F 1/1626 400/472 |
| 2006/0084482 | A1* | 4/2006 | Saila | G06F 1/1626 455/575.1 |
| 2007/0101297 | A1* | 5/2007 | Forstall et al. | 715/841 |
| 2008/0034314 | A1* | 2/2008 | Louch et al. | 715/778 |
| 2008/0062625 | A1* | 3/2008 | Batio | G06F 1/1615 361/679.29 |
| 2009/0046076 | A1* | 2/2009 | Bychkov | G06F 3/0489 345/173 |
| 2009/0111511 | A1* | 4/2009 | Bengtsson | H04M 1/72519 455/556.1 |
| 2009/0160931 | A1 | 6/2009 | Pockett et al. | |
| 2009/0213081 | A1* | 8/2009 | Case, Jr. | G06F 1/1616 345/173 |
| 2009/0256809 | A1* | 10/2009 | Minor | 345/173 |
| 2009/0282429 | A1* | 11/2009 | Olsson | H04N 13/0477 725/10 |
| 2010/0053151 | A1* | 3/2010 | Marti | G06F 3/011 345/419 |
| 2010/0064212 | A1 | 3/2010 | Snyder | |
| 2010/0194705 | A1* | 8/2010 | Kim et al. | 345/173 |
| 2010/0277420 | A1 | 11/2010 | Charlier et al. | |
| 2011/0260982 | A1* | 10/2011 | Trout | G06F 1/1626 345/169 |
| 2011/0261058 | A1* | 10/2011 | Luo | G06F 1/1626 345/441 |
| 2012/0005624 | A1* | 1/2012 | Vesely | G06F 3/012 715/808 |
| 2012/0026069 | A1* | 2/2012 | Ohsaki | G06F 1/1616 345/1.2 |

OTHER PUBLICATIONS

Laura June, Back-typing keyboard prototype doesn't need a desk, your attitude, Nov. 14, 2008, 5 pages.*
Sean Hollister, Microsoft Research reveals RearType, puts QWERTY back where it belongs, Aug. 10, 2010, 4 pages.*
Korean Office Action from related Korean Patent Application No. 10-2013-7021904 dated Feb. 4, 2015; 3 pages.
PCT Search Report from related PCT/US2011/021910; Apr. 19, 2011; 5 pages.
No author; "3D iPhone Apps, Games, and Movies is Possible with a 3D Screen," from http://www.theappsmachine.com/iphone-news-and-rumors/3d-iphone-apps-games-and-movies-is-possible-with-a-3d-screen/; Dec. 8, 2008; 2 pages.
Flynn, Conor; "Samsung W960 is the first AMOLED 3D Display Phone," http://www.slipperybrick.com/2010/05/samsung-w960-is-the-first-amoled-3d-displayphone/; May 9, 2010; 4 pages.
Baudisch, Patrick et al.; "Back-of-Device Interaction Allows Creating Very Small Touch Devices," submitted to CHI 2009, Apr. 2005; Copyright 2006; 10 pages.
Hiraoka, Shigeo et al.; "Behind Touch: Backside Keys with Tactile Sense Interface for Mobile Phones," Transactions of Information Processing Society of Japan; vol. 44, No. 11, Nov. 2003; 8 pages.
Stevens, Tim; "Next Gen PSP to have touch controls—on the wrong side?" from http://www.engadget.com/2010/08/19/next-gen-psp-to-have-touch-controls-on-the-wrong-side/; Aug. 19, 2010; 1 page.
Hollister, Sean; "Sony fires barrage of touchscreen patent applications, only one points at new PSP," from http://www.engadget.com/2010/11/28/sony-fires-barrage-of-touchscreen-patent-applications-only-one/; Nov. 28, 2010; 1 page.
Wong, Sy; Spatial View's 3DeeSlide App Enables 3D View on iPhone/iPad and Android Smartphones from http://www.mydigital-life.info/2010/09/26/spatial-views-3deeslide-app-enables-3d-view-on-iphoneipad-and-android-smartphones/; Sep. 26, 2010; 2 pages.
van der Klein, Raimo; Layar Reality Browser; originally available at http://layar.com/3d; retrieved from http://web.archive.org/web/20091028061839/http://layar.com/3d/; 2009; 4 pages.
Wigdor, Daniel et al.; "LucidTouch: A See-Through Mobile Device;" from http://www.youtube.com/user/newscientistvideo#p/u/460/aASuL7RHJHM; Oct. 11, 2007; video transcribed Jul. 12, 2011.
Paul, Franklin; "Nintendo Shows Off 3D Portable Game Device," from http://www.reuters.com/article/2010/06/15/us-e3-nintendo-idUSTRE65E4LP20100615?type=technologyNews; Jun. 15, 2010; 1 page.
Korean Office Action from related Korean Patent Application No. 10-2013-7021904 dated May 27, 2014; 5 pages.
Korean Office Action from related Korean Patent Application No. 10-2013-7021904 dated Nov. 27, 2014; 3 pages.
Canadian Office Action from related Canadian Patent Application No. 2,825,131 dated Dec. 9, 2014; 3 pages.
Canadian Office Action dated Sep. 30, 2016, received for Canadian Application No. 2,825,131.

* cited by examiner

THREE-DIMENSIONAL, MULTI-DEPTH PRESENTATION OF ICONS IN ASSOCIATION WITH DIFFERING INPUT COMPONENTS OF A USER INTERFACE

RELATED APPLICATION(S)

This application is related to U.S. patent application Ser. No. 13/010,539, entitled THREE-DIMENSIONAL, MULTI-DEPTH PRESENTATION OF ICONS ASSOCIATED WITH A USER INTERFACE and filed on even date herewith, which is incorporated by reference in its entirety herein.

TECHNICAL FIELD

This disclosed concept relates generally to the presentation of icons associated with a user interface and more particularly to the use of three-dimensional displays in these regards.

BACKGROUND

Portable electronic devices (such as mobile-communications devices, cellular telephony devices, pad and tablet-based computers, personal digital assistants, and so forth) typically provide a user interface to permit selection of a desired functionality and interaction in other ways with the device and its applications. As various devices become ever more capable, and as the device users themselves expect an ever-increasing number of capabilities from their devices, it is not unusual for a device to include a user interface with more than one input component or for a device to include more than one user interface.

As one example in these regards, a device may have a first user interface (such as a first touch-screen display on a first side of the device) and a second user interface (such as a second touch-screen display) on a second side of the device. This approach typically requires the device user to rotate their device 180 degrees in order to view and access the different user interfaces on the various sides of the device. Alternatively, the device user may memorize what user inputs are available on the hidden side of their device.

As another example in these regards, a device may have a user interface with more than one input component. For example, a device may have a first input component (such as a touch-screen display) on a first side of the device and one or more physical buttons, switches, touchpads, or the like on a second side of the device. As a yet further example in these regards, a device may have a user interface that makes use of user inputs on opposite sides of the device (such as the front and back of the device), where the user inputs may be part of a user interface that coordinates the inputs from the various user inputs.

Figure 1:
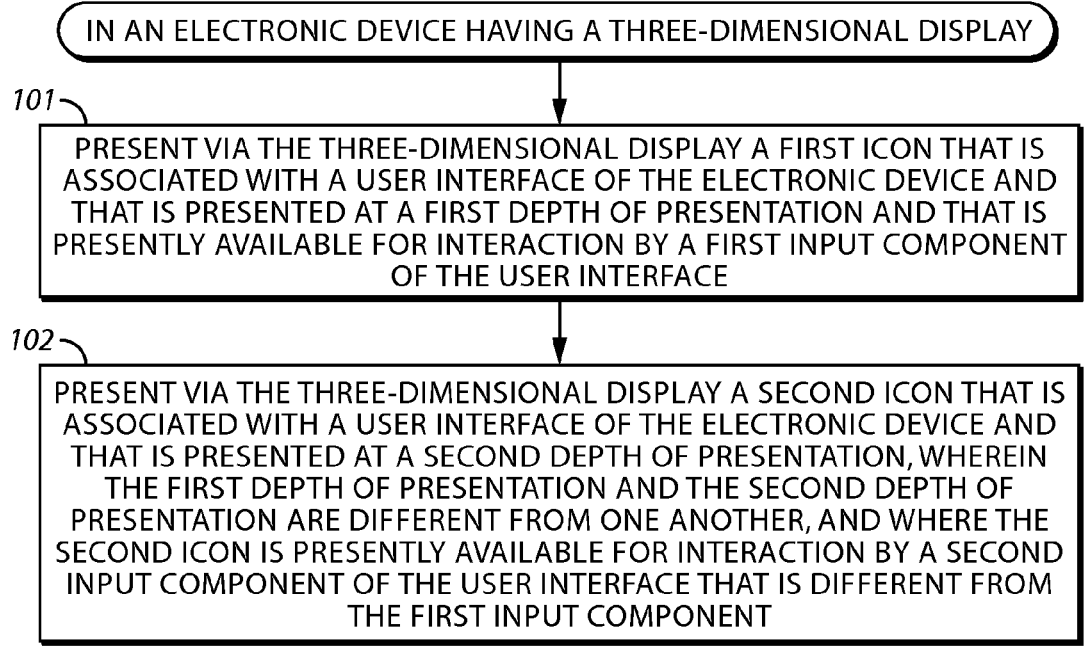
FIG. 1 comprises a flow diagram as configured in accordance with various embodiments of the disclosed concept.

Elements in the figures are illustrated for simplicity and clarity and have not necessarily been drawn to scale. For example, the dimensions, relative positioning, or both of some of the elements in the figures may be exaggerated relative to other elements to help to improve understanding of various embodiments of the disclosed concept. Also, common but well-understood elements that are useful in a commercially feasible embodiment may be omitted from the figures in order to facilitate a less obstructed view of these various embodiments of the disclosed concept.

DETAILED DESCRIPTION

The present disclosure describes a user interface that employs a three-dimensional display. In this disclosure, a three-dimensional display is any display apparatus capable of conveying a stereoscopic perception of three-dimensional (3D) depth to a viewer, and may hereafter be referred to as a "display" or "stereoscopic display" for the sake of brevity. It should be understood that a three-dimensional display may utilize dual two dimensionally (2D) displayed images (one for each of the viewer's left and right eye) to create a virtual three-dimensional image. The generation of a virtual three-dimensional image or icon using a 3D display may be referred to as "presenting" the image because the image may be perceived by the viewer to appear at various distances from the viewer without regard to the physical location of the 3D display apparatus. In this disclosure, "presenting" refers to the use of a three-dimensional display to cause the display of one or more components of an image, such the displayed components create the appearance of a single image perceived by an observer. An image presented at a specific depth of presentation may comprise multiple components of the image that may be mentally combined by the observer to create the appearance of a single image at a depth of presentation (e.g., at a perceived distance) from the observer.

The three-dimensional display serves to present a plurality of icons that are associated with a user interface of the corresponding electronic device. The plurality of icons includes at least a first icon presented at a first depth of presentation and a second icon presented at a second, different depth of presentation. The first icon at the first depth of presentation is associated with a first input component of the user interface and the second icon is associated with a second, different input component of the user interface. The first input component provides for interaction with the first icon presented at the first depth of presentation, and the second input component provides for interaction with the second icon presented at the second depth of presentation.

In this disclosure, an icon that is available for interaction by a particular input component of a user interface is one that can be selected to invoke a corresponding program, process, application, function, capability, media file, Internet address, personal information management (PIM) record, or the like. An icon that is unavailable for interaction by the input component is said to be presently unavailable for selection, even though the icon may be presented via the 3D display. In other words, an icon is presented to a viewer (for example, to make the viewer aware of its presence), and is either available or unavailable for selection by interacting with a particular input component. By one approach, the icon that is unavailable for interaction with a particular input component may be presented in a disabled, incapacitated, or inoperative state. It should be understood that an icon that is unavailable for interaction with a first input component may still be available for interaction with a second input component.

Furthermore, certain types of input components may be capable of providing interaction with more than one depth of presentation. For example, a touch-sensitive surface may provide for interaction at a depth of presentation just above the surface by detecting a light touch, single tap, or mere proximity to a "touchless" touch-screen. The same touch-sensitive surface may provide for interaction with an icon at the same depth of presentation that coincides with the surface of the touch-sensitive surface, by detecting, for example, a forceful touch, double tap, or physical contact with the touch-sensitive surface.

It should also be understood that a user interface may disable, restrain, ignore, treat, or otherwise make icons presented at a particular depth of presentation that is unavailable for interaction with a particular input component of the user interface. By one approach, the user interface may refrain from responding to a detected input associated with a disabled or unavailable icon (e.g., unavailable for interaction by an input component) at the input component. Icons that are presented at the unavailable depth of presentation may be considered unavailable by virtue of the type of input component. For example, where the input component is a touch-sensitive surface of the electronic devices, icons that are presented at the depth of presentation associated with the touch-sensitive surface are available for selection by detecting a touch on the touch-sensitive service (e.g., touching the surface at a location where the icon is presented). Icons presented above or below the touch-sensitive surface may be said to be made unavailable, disabled, or treated as unavailable due to the inability to detect a touch associated with the icon.

In many examples provided in this disclosure, either or both of the first input component and the second input component may comprise touch-sensitive surfaces. Alternatively, each input component may be a touch-sensitive display, a mouse, a touchpad, a track pad, an electronic pen, a user interface glove, or other input component configured to allow interaction with icons presented at a depth of presentation associated with the input component. For example, the first depth of presentation may be perceived to be associated with a selection capability of the first input component, while a second, different depth of presentation may be perceived to be unassociated with the selection capability of the first input component, and vice versa.

By one approach the aforementioned first depth of presentation can substantially coincide with a first control surface (such as a touch-sensitive display as a first input component of the user interface) of the corresponding electronic device. So configured, the first icon (which is available for interaction by the first input component) appears at a depth of presentation that coincides with that first control surface. This may be done by presenting the left and right eye image for the first icon at substantially a same location on the three-dimensional display, or by presenting left and right eye images that are substantially identical to each other. This approach can facilitate use of the touch-sensitive display when selecting a particular icon that is presented in substantial coincidence with the touch-sensitive display.

In turn, the aforementioned second depth of presentation can substantially coincide with a second control surface (such as second touch-sensitive surface or one or more tactilely-distinctive areas) located on a different side of the electronic device from the aforementioned first control surface. So configured, the second icon (which is available for interaction by the second input component) appears at a depth of presentation that coincides with the second control surface of the electronic device. For example, the second control surface may be located on a side of the electronic device that is opposite from the first control surface. This approach can facilitate use of both control surfaces of the electronic device as part of a user interface, even though one of the control surfaces may be physically hidden from view but represented by the three-dimensional presentation of the icons at the second depth of presentation. As a simple illustrative example in these regards, some icons can be presented at a depth that is perceived to be below the display (i.e., at a depth of perception that is associated with the second control surface of the electronic device). This may be done by presenting differing left and right eye images for such icons (e.g. at slightly offset locations) on the three-dimensional display to create the perception of icons at depths below the display. Icons that are presented at a depth of presentation associated with the second control surface may be available for interaction by the second input component, and unavailable for interaction by the first input component.

Such an approach may greatly improve the overall usability of an electronic device and also the speed and convenience by which a device user can utilize and leverage the full capabilities of the device. Furthermore, the disclosed concept may prevent inadvertent assertion of at least some of the icons by limiting selection capability of each input component to, for example, only icons presented at a depth of presentation associated with each input component. When the icons that are available for interaction are perceived to be associated with a selection capability of a particular input component or are perceived to coincide in space with the selection capability of the particular input component, the overall effect is highly intuitive and ergonomically sensible. This is particularly useful when an input component may otherwise be directly hidden from view and the three-dimensional presentation of the icons provide a visual cue for the location of the input component.

Those skilled in the art will appreciate that these teachings can be implemented in a variety of commercially viable ways. It will further be appreciated that these teachings are highly scalable and can be used with a variety of differently-sized user interfaces, icons, electronic devices, and so forth. These and other benefits may become clearer upon making a thorough review and study of the following detailed description.

Referring now to the drawings, and in particular to FIG. 1, an illustrative process 100 that is compatible with many of these teachings will be described.

In this illustrative example, an electronic device carries out the described process 100. Electronic devices referred to in this disclosure may include, for example, portable electronic devices, simple cellular telephones, smart telephones, wireless personal digital assistants (PDAs), laptop computers, tablets, portable gaming devices, televisions, monitors, or other electronic devices. For the purposes of this description this electronic device has at least one three-dimensional display such as, but not limited to, a stereoscopic display.

The expression "three-dimensional display" may refer to a physically two-dimensional active display (such as a liquid-crystal display or a light-emitting diode display) that is capable of portraying a virtual three-dimensional image (either alone or in conjunction with, for example, special lenses through which the viewer gazes at the display). For example, a three-dimensional display comprising a stereoscopic display may present offset images that are displayed separately to the left and right eye. Both of these 2-D offset images are then mentally perceived by the viewer as a single 3-D image. Examples of this technology include anaglyph images and polarized glasses. Autostereoscopic display technologies may use optical components in the display, rather than spectacles worn by the viewer, to enable each eye to see a different image. In another example, a three-dimensional display comprising a holographic display may utilize interference of coherent light to create a light field identical to that which would emanate from an image at a particular depth of perception. Still further examples of technologies suitable for three-dimensional displays may include volumetric displays, lenticular displays, or free-space displays.

Various three-dimensional displays are known in the art and other approaches will likely be developed going forward. It should be understood that three-dimensional displays in this disclosure may comprise any display apparatus capable of conveying the appearance of an icon at various depths of perception. As the present teachings are not particularly sensitive to any specific choices in these regards, further elaboration here will not be provided for the sake of brevity.

This illustrative example also presumes that this electronic device further comprises a user interface having at least a first input component and a second, different input component. By one approach, this first input component and the three-dimensional display can comprise an integrated component (where, for example, the integrated component comprises, at least in part, a touch-sensitive display located on a front surface of the electronic device).

At step 101 this process 100 provides for presenting, via the aforementioned three-dimensional display, a plurality of icons. The plurality of icons is associated with the aforementioned user interface that corresponds to the electronic device. Icons each serve to represent a corresponding program, process, application, function, capability, media file, Internet address, personal information management (PIM) record, or the like. In many cases a plurality of such icons are displayed using, for example a touch-sensitive display. At least under some circumstances an icon is selectable based on an interaction with the user interface (with, for example, an input component of the user interface). For the sake of illustration and not by way of limitation, a particular icon may be associated with any of a variety of applications (i.e., so-called "apps").

Figure 2:
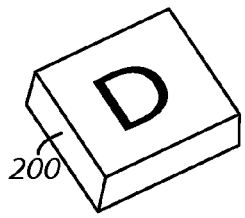
FIG. 2 comprises a perspective schematic view as configured in accordance with various embodiments of the disclosed concept.

By one approach at least some of these icons can comprise two-dimensional images. If desired, however, and continuing to presume upon the capabilities of the three-dimensional display, one or more of these icons can themselves comprise a three-dimensional image. Referring momentarily to FIG. 2, a simple illustrative example in these regards comprises a virtual three-dimensional button 200 that presents a corresponding icon (here, the alphabetic character "D").

Returning again to FIG. 1, at step 101 this presentation of icons includes presenting at least a first icon and a second icon where these icons are presented at differing depths of presentation. That is, to a viewer of the display who is able to discern the three-dimensional content thereof, one of these depths of presentation will appear, for example, to be closer to the viewer than the other. Further elaboration in these regards appears below.

In this illustrative example, and notwithstanding the different depths of presentation, both the first and second icon are available for interaction in the user interface, albeit for potentially separate input components of the user interface. (As used herein, "interaction" shall be understood to comprise asserting or identifying an icon in order to activate (or return to) a corresponding capability as a direct consequence and result of having so chosen or identifying that icon.) In particular, the first icon (which is presented at the first depth of presentation) is presently available for interaction by the aforementioned first input component of the user interface. The second icon, in turn, is presently available for interaction by the aforementioned second input component of the user interface. While the first icon is available for interaction by the first input component, it is unavailable for interaction by the second input component, and vice versa.

Figure 3:
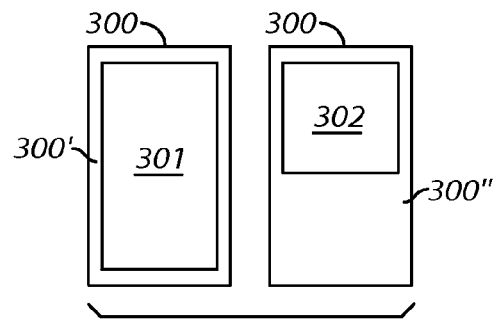
FIG. 3 comprises a front and back elevational schematic view as configured in accordance with various embodiments of the disclosed concept.

As suggested earlier, these first and second input components can be located on opposing sides of the electronic device. FIG. 3 offers a simple example in these regards. Here, the front side 300' of the electronic device 300 has a three-dimensional display 301 that also comprises a touch-sensitive display to serve as the first input component. The back side 300" of the electronic device 300, in turn, has a touch-sensitive surface 302 that may also comprise a two-dimensional display. (It will be understood that the specifics of this example are intended to serve only in an illustrative example and are not intended to suggest any particular limitations in these regards. For example, though the display 302 on the back side 300" of the electronic device 300 is shown as being only half the size of the display 301 on the front side 300' of the electronic device 300, essentially any other proportionality of choice could be utilized as desired. It should be understood that labels for "front side" and "back side" of a device as used in this disclosure are meant to refer interchangeably to opposing sides of an electronic device.)

Figure 4:
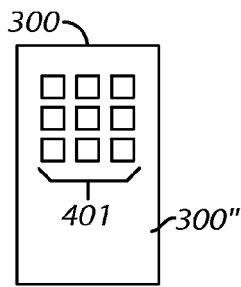
FIG. 4 comprises a back elevational schematic view as configured in accordance with various embodiments of the disclosed concept.
Figure 5:
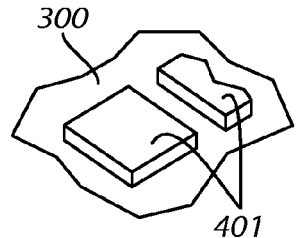
FIG. 5 comprises a perspective schematic detail view as configured in accordance with various embodiments of the disclosed concept.

If desired, the second input component on the backside 300' of the electronic device 300 can comprise other than a touch-sensitive surface. As a simple, illustrative example in these regards and again without intending any limitations by way of this example, FIG. 4 depicts an alternative of the back side 300" wherein the second input component comprises, at least in part, a keypad 401. So configured, the second input component comprises a plurality of tactilely-distinctive areas. As one example in these regards, and referring momentarily to FIG. 5, each of the keys of the keypad 401 can comprise a raised keycap that is generally haptically discernable by the fingers of a device user. It should be understood that other types of input components can be conceivably used on the back side 300" of the device, such as would be readily apparent to those of skill in the art.

Figure 6:
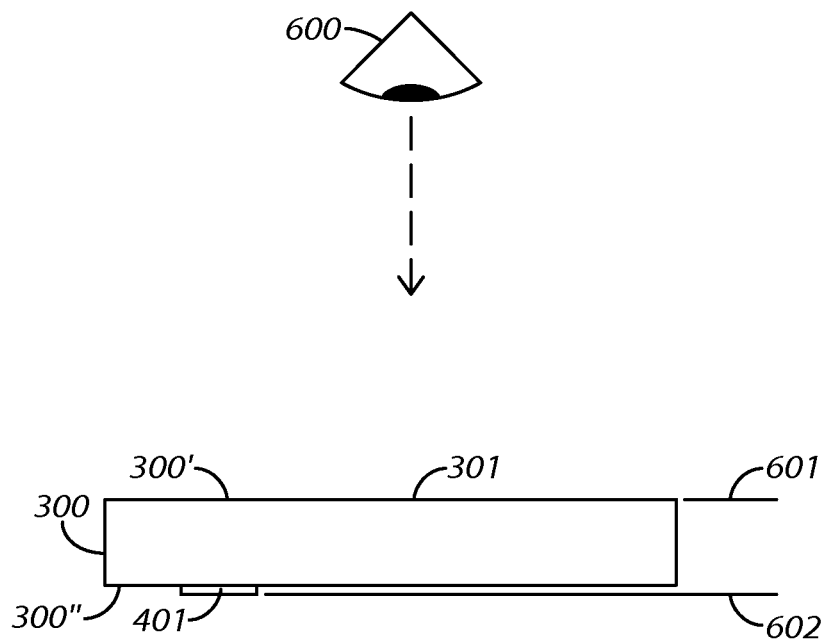
FIG. 6 comprises a side elevational schematic view as configured in accordance with various embodiments of the disclosed concept.
Figure 7:
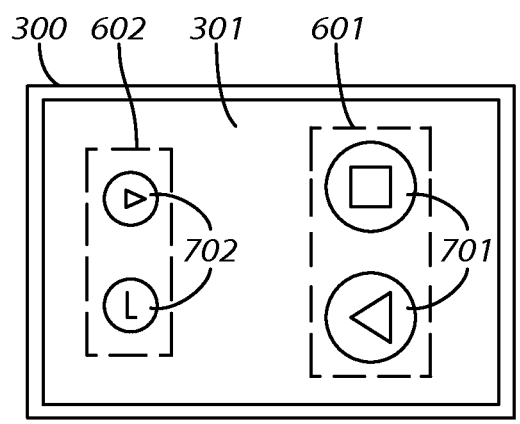
FIG. 7 comprises a front elevational schematic view as configured in accordance with various embodiments of the disclosed concept.
Figure 8:
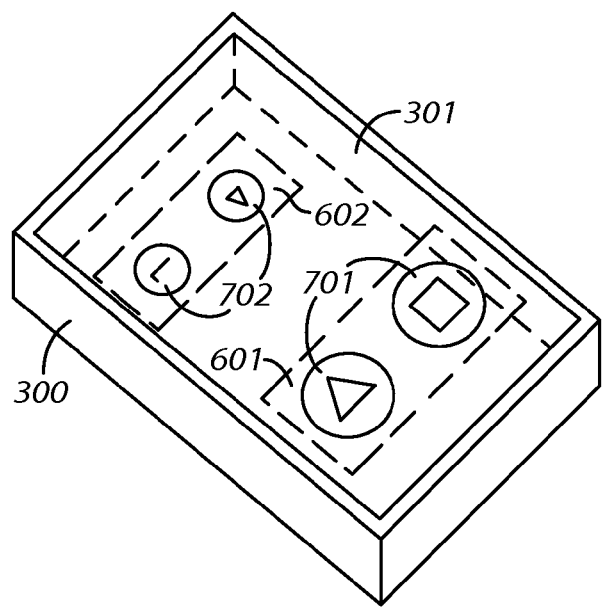
FIG. 8 comprises a perspective block diagram view as configured in accordance with various embodiments of the disclosed concept.

FIG. 6 provides a side view of such an electronic device 300 having a touch-sensitive display 301 (that also provides the aforementioned three-dimensional presentations of icons) on one side of the device 300 and a keypad 401 on an opposing side of the electronic device 300. In this example, and from the point of view of an observing viewer 600, the aforementioned first depth of presentation 601 may be substantially coplanar with the touch-sensitive display 301 and the second depth of presentation 602 may be substantially coplanar with the keypad 401. Accordingly, and referring now to FIGS. 7 and 8, icons 701 presented at that first depth of presentation 601 substantially coincide with the control surface of the touch-sensitive display 301. Similarly, icons 702 presented at the second depth of presentation 602 substantially coincide with the control surface of the keypad 401 (in this case, one or more of the keys of the keypad 401).

Because the first depth of presentation 601 is closer to the observing viewer 600 than the second depth of presentation 602, the icons 701 displayed at the first depth of presentation 601 will typically appear to be larger than the icons 702 displayed at the second depth of presentation 602 in keeping with the perspective that would prevail if the device 300 were in fact transparent and the observing viewer 600 were able to actually see such icons physically disposed on or in conjunction with the keypad 401.

By one approach this difference in size can reflect the actual geometry and form factor of the device. If desired, however, this difference in size can be exaggerated to make it easier to visually distinguish the icons that are associated with the input component on the front surface from the icons that are associated with the input component on the backside of the electronic device 300.

It will be understood that the displayed icons can be laterally offset from one another as desired. For example, by one approach, the icons appearing at differing depths of presentation can be substantially coincident such that they appear to be layered, offset, or even stacked one above the other. In such a case it may be useful to present at least the higher-level icons in a transparent or translucent manner to permit lower-level icons to be readily perceivable by the observing viewer. As another example, and again as desired, the icons appearing at differing depths of presentation can be laterally offset from one another to avoid having icons at higher levels occluding part or all of the icons that appear at lower depths of presentation.

Those skilled in the art will recognize and understand that there are no particular limitations in these regards as to how many icons are presented. These teachings will also accommodate providing more than one cluster of grouped icons at a given, shared depth of presentation if desired. For example, a first group of three icons could be presented at one portion of any of the depicted depths of presentation and a second group of icons could also be presented at a different, removed portion of that same depth of presentation.

In the illustrative examples described above the icons are all available to be interaction by a particular input component of a user interface, albeit with at least one icon pertaining to a first input component associated with a first depth of presentation while at least another such icon pertains to second input component associated with another depth of presentation. These teachings will also optionally accommodate, if desired, also presenting (for example, at yet other depths of presentation) other icons that are not available for interaction by any input component. Various details in these regards, including the use of additional depths of presentation and moving icons from one depth of presentation to another, can be found in the aforementioned THREE-DIMENSIONAL, MULTI-DEPTH PRESENTATION OF ICONS ASSOCIATED WITH A USER INTERFACE, the contents of which have been fully incorporated by reference herein.

Figure 9:
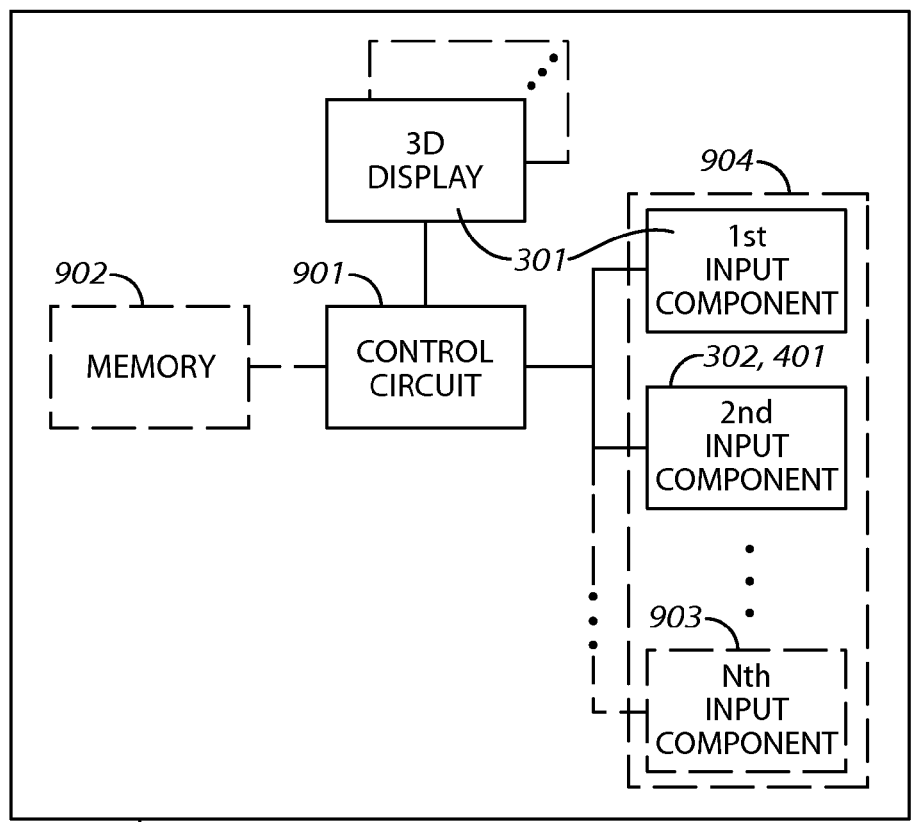
FIG. 9 comprises a block diagram view as configured in accordance with various embodiments of the disclosed concept.

The above-described processes are readily enabled using any of a wide variety of available, readily-configured platforms, including partially or wholly programmable platforms as are known in the art or dedicated purpose platforms as may be desired for some applications. Referring now to FIG. 9, an illustrative approach to such a platform will now be described.

In this illustrative example the electronic device 300 comprises a portable electronic device. As explained above, however, any number of devices can readily serve in these same regards as desired This electronic device 300 comprises, at least in part, a control circuit 801 that operably couples to one or more three-dimensional displays 301. The electronic device 300 also comprises a user interface 904 with two or more input components. By one approach this can include a first input component comprising a touch-sensitive capability that comprises a part of one or more of the aforementioned three-dimensional displays 301. A second input component of the user interface can comprise any of a variety of modalities of interaction as desired. For example, in addition to the touch-sensitive display 302 or key-based approaches 401 described above, this input component may comprise a gesture-recognition interface, a speech-recognition interface, physical (as versus virtual) buttons, switches, scroll wheels, track pads, cameras, accelerometers, gyroscopes, proximity sensors, or the like, and so forth. And, as suggested by optional inclusion of the Nth input component 903, these teachings will accommodate any number of additional input components as desired.

The control circuit 901 can comprise a fixed-purpose hard-wired platform or can comprise a partially or wholly programmable platform as desired. This control circuit 901 is configured (for example, by corresponding programming as will be well understood by those skilled in the art) to carry out one or more of the features described herein. For example, programming executed by the control circuit 901 may cause the electronic device to:

use a three-dimensional display to present a virtual three-dimensional scene comprising a plurality of icons, including at least a first icon presented at a first depth of presentation and a second icon presented at a second depth of presentation, where the first and second depths of presentation are different from one another;

wherein the first icon is associated with the first input component of the user interface, and the second icon is associated with the second input component of the user interface; and wherein the first input component provides for interaction with the first icon presented at the first depth of presentation, and the second input component provides for interaction with the second icon presented at a second depth of presentation. All of these architectural options regarding fixed-purpose designs as well as partial and full programmability are well known and understood in the art and require no further description here.

By one approach this electronic device 300 can further comprise a memory 902 that operably couples to the control circuit 901 (or, if desired, comprises a part thereof). This memory can serve to store content to be displayed by the three-dimensional display 301 (such as one or more of the icons contemplated herein). When the control circuit 901 comprises a component that is at least partially programmable, this memory 902 can also serve to store the instructions to be carried out by the control circuit 901.

Such an electronic device 300 may be comprised of a plurality of physically distinct elements as is suggested by the illustration shown in FIG. 9. It is also possible, however, to view this illustration as comprising a logical view, in which case one or more of these elements can be enabled and realized via a shared platform.

So configured, an electronic device having a three-dimensional display capability can simultaneously present, in a useful and intuitive manner, control-surface icons for control surfaces that are available on opposing sides of the device without requiring the device user to flip the device. Presuming the availability of the three-dimensional display itself, these teachings can be readily implemented in high cost-effective ways and often without requiring other dedicated physical components.

The present disclosure also shows a way of associating a tactilely-distinctive area such as a convex or concave shape formed on the back of a device with a similarly-shaped three-dimensional image. Thus when a shape is present on the back of the device, a corresponding conformal three-dimensional image (corresponding substantially to the shape and the depth location of the shape on the back of the device) may be presented. The similarity between the feel of the tactilely-distinctive shape and the corresponding image has the advantage of intuitively associating the image with the shape. For example, a rectangular bump out the back of the device can have an icon with a conforming shape associated therewith, such that an interaction with the rectangular bump activates an associated process. In other embodiments, the bump and corresponding image need not be related to the user interface and may contribute to the ornamental elements of the device.

It should be understood that the terms and expressions used herein have the ordinary technical meaning as is accorded to such terms and expressions by persons skilled in the technical field as set forth above except where different specific meanings have otherwise been set forth herein. Certain actions or steps may be described or depicted in a particular order of occurrence while those skilled in the art will understand that certain actions or steps may be performed in a variety of sequences without departing from the scope of the present disclosure.

Those skilled in the art will recognize that a wide variety of modifications, alterations, and combinations can be made with respect to the above described embodiments without departing from the scope of the disclosed concept, and that such modifications, alterations, and combinations are to be viewed as being within the ambit of the inventive concepts disclosed herein.

We claim:

1. A method in an electronic device having a three-dimensional display, the method comprising:

simultaneously presenting via the three-dimensional display a plurality of icons associated with a user interface of the electronic device, the plurality of icons including a first icon presented at a first depth of presentation and a second icon presented at a second depth of presentation different from the first depth of presentation, wherein the first depth of presentation is co-planar with a first surface of the electronic device and the second depth of presentation is co-planar with a second surface of the electronic device that is opposite the first surface;

associating the first icon with a first input component of the user interface disposed on the first surface; and associating the second icon with a second input component of the user interface disposed on the second surface, wherein the first input component and the second input components are physical input components, whereby the first input component provides for interaction with the first icon presented at the first depth of presentation and not the second icon presented on the second depth of presentation, and the second input component provides for interaction with the second icon presented at the second depth of presentation and not the first icon presented at the first depth of presentation, and wherein the three dimensional display presents a first image to a first eye of a viewer and a second image different from the first image to a second eye of the viewer to produce the first depth of presentation of the first icon and the second depth of presentation of the second icon.

2. The method of claim 1, wherein the first input component of the user interface is on a front side of the electronic device and the second input component of the user interface is on a back side of the electronic device.

3. The method of claim 1, wherein the first input component of the user interface comprises a first touch-sensitive surface and the first touch-sensitive comprises the first surface.

4. The method of claim 3, wherein the first touch-sensitive surface comprises a touch-sensitive display.

5. The method of claim 3, wherein the second input component of the user interface comprises a second touch-sensitive surface and the second touch-sensitive surface comprises the second surface.

6. The method of claim 3, wherein the second input component of the user interface comprises, at least in part, a keypad.

7. The method of claim 6, wherein the second depth of presentation at least substantially coincides with the keypad such that the second icon at the second depth of presentation at least substantially coincides with at least one key of the keypad.

8. The method of claim 1, wherein the second input component of the user interface comprises, at least in part, at least one tactilely-distinctive area.

9. The method of claim 8, wherein the second icon at the second depth of presentation at least substantially coincides with the at least one tactilely-distinctive area.

10. The method of claim 9, wherein the at least one tactilely-distinctive area has a three-dimensional shape and the second icon has a corresponding three-dimensional shape.

11. The method of claim 1, wherein the three-dimensional display comprises a stereoscopic display.

12. An apparatus comprising:

a control circuit;

a user interface having a first input component disposed on a first surface of the apparatus and a second input component disposed on a second surface of the electronic device that is opposite the first surface, wherein the first input component and the second input components are physical input components; and a three-dimensional display operably coupled to the control circuit, wherein the control circuit is configured to use the three-dimensional display to present a virtual three-dimensional scene comprising a plurality of icons, including at least a first icon presented at a first depth of presentation and a second icon presented at a second depth of presentation, where the first and second depths of presentation are different from one another, wherein the first depth of presentation is co-planar with the first surface of the apparatus and the second depth of presentation is co-planar with the second surface of the apparatus, wherein the first icon is associated with the first input component of the user interface, and the second icon is associated with the second input component of the user interface, wherein the first input component provides for interaction with the first icon presented at the first depth of presentation and not the second icon presented on the second depth of presentation, and the second input component provides for interaction with the second icon presented at a second depth of presentation and not the first icon presented at the first depth of presentation, and wherein the three dimensional display presents a first image to a first eye of a viewer and a second image different from the first image to a second eye of the viewer to produce the first depth of presentation of the first icon and the second depth of presentation of the second icon.

13. The apparatus of claim 12, wherein the apparatus comprises a mobile communications device.

14. The apparatus of claim 12, wherein the first input component is on a front side of the apparatus and the second input component is on a back side of the apparatus.

15. The apparatus of claim 14, wherein the first input component of the user interface comprises a first touch-sensitive surface and the first depth of presentation at least substantially coincides with the first touch-sensitive surface.

16. The apparatus of claim 15, wherein the second input component of the user interface comprises a second touch-sensitive surface and the second depth of presentation at least substantially coincides with the second touch-sensitive surface.

17. The apparatus of claim 12 wherein the second input component of the user interface comprises, at least in part, a keypad.

18. The apparatus of claim 17, wherein the keypad comprises, at least in part, at least one tactilely-distinctive area.

19. The apparatus of claim 18, wherein the second depth of presentation at least substantially coincides with the keypad such that at least one of the second icon at the second depth of presentation at least substantially coincides with the at least one tactilely-distinctive area.

20. The apparatus of claim 19, wherein the second icon has a form factor that at least substantially coincides with a form factor for the at least one tactilely-distinctive area.

* * * * *